Jan. 8, 1946.  P. P. DILBERT  2,392,368

HOOK COUPLING

Filed Aug. 29, 1944

Inventor

Peter P Dilbert

By

Attorneys

Patented Jan. 8, 1946

2,392,368

UNITED STATES PATENT OFFICE 2,392,368

HOOK COUPLING

Peter P. Dilbert, Reading, Ohio

Application August 29, 1944, Serial No. 551,764

7 Claims. (Cl. 280—33.15)

(Granted under the act of March 3, 1883, as amended April 30, 1928; 370 O. G. 757)

The invention described herein may be manufactured and used by or for the Government for governmental purposes, without payment to me of any royalty thereon.

This invention relates generally to hook couplings but more particularly to that class wherein a locking means is provided to prevent the accidental separation of the hook from the retaining eye.

One object of the invention is to provide a safe, durable and easily operated coupling which is adaptable for coupling tractor trailer trains, and one which can be relied upon to avoid the damaging of supplies caused by tow carts becoming unfastened while in transit.

Another object of the invention is to provide couplings which can be used for the operation of longer trains and thus effect an appreciable saving in man hours.

Another object of the invention is to provide a coupling device of the class described, which is composed of few parts of simple construction and which may be easily and cheaply manufactured.

With these and other objects in view, the invention consists in certain novel features of construction and combinations and arrangements of parts which will be fully described and pointed out in the claims hereinafter.

Referring to the figures in which like parts are indicated by similar reference characters:

Figure 1:
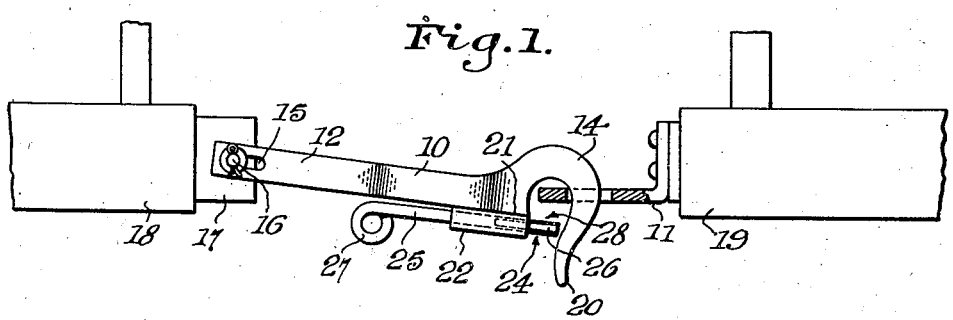
Figure 1 is an elevation showing the improved coupling connecting adjacent end portions of trucks of a trailer train.
Figure 2:
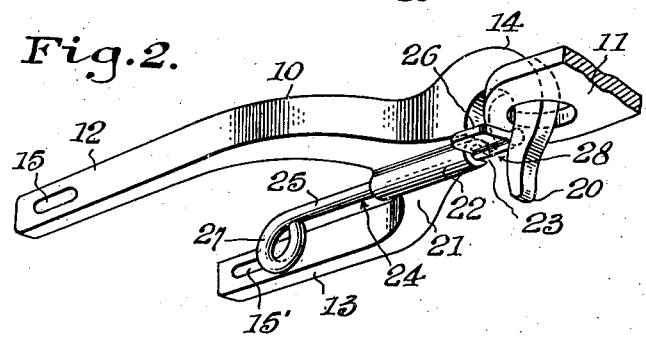
Figure 2 is a perspective view showing the hook in engagement with the eye member, and with the keeper in locked position.
Figure 3:
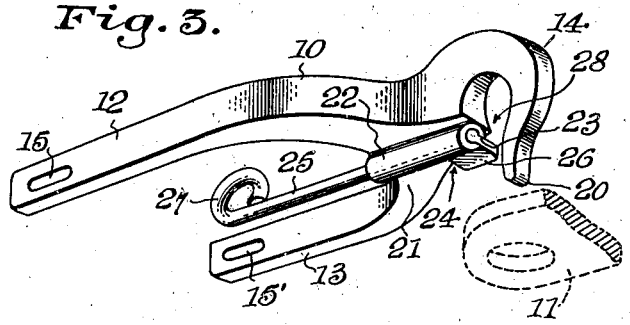
Figure 3 is a perspective view showing the hook in engagement with the eye member, and the keeper in unlocked position.
Figure 4:
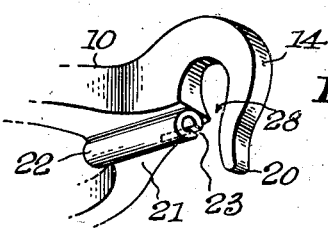
Figure 4 is a perspective view showing an end of the hook to illustrate the construction of the keeper barrel and to show the location and extension of the slot therein.
Figure 5:
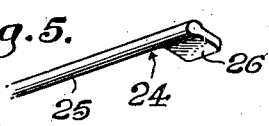
Figure 5 is a perspective view showing one end of the keeper member.

Referring to Figs. 1, 2 and 3, the numerals 10 and 11 indicate respectively the hook and eye members of the coupling. The draft or hook member 10 is composed of a yoke member having rearwardly extending parallelly spaced arms 12 and 13 and a forwardly extending portion positioned on the medium plane of the yoke which is formed as a hook 14.

The rearwardly extending arms 12 and 13 are each provided with a longitudinally slotted opening 15 and 15' adjacent the rear eds thereof. These slots are adapted to receive a bolt 16 which pivotally connects the hook to supporting members 17, only one being shown, and which project from the body or chassis of a tractor or trailer. The eye member 11 which the hook engages is attached to the adjacent vehicle in the train, the end portions of the vehicles being indicated by the numerals 18 and 19 in Fig. 1.

The hook 14 is provided with a bill portion 20 which extends below the plane of the lower surfaces of the arms 12 and 13.

The plane of the lower surface of the arms 12 and 13 extends beneath the base portion of the hook as indicated by the numeral 21 and to this portion 21 of the under surface is welded a barrel or tubular sleeve bearing 22 which is provided with a longitudinal slotted opening 23 at its forward end.

Within the barrel or cylindrical bearing 22 is slidably and rotatably mounted a keeper or latch member 24 which is composed of a central shank or shaft portion 25 having a rectangularly shaped lug 26 projecting radially from one end thereof. After mounting the shank within barrel or sleeve 22 the opposite end of said shaft is turned in a circle to form a handle 27 which functions as a weight to retain the keeper in locked position as will be further described.

When the shaft 25 is pushed forward within the barrel 22 its forward portion on which is formed the lug 26 closes the channel or hook opening 28. The channel 28 may be cleared or opened by retracting the shaft 25 after it has been rotated within the barrel so that the lug 26 can enter the slotted opening 23.

In the operation of the device the keeper 24 must first be in an open or retracted position, that is with the lug 26 within the slotted opening 23. When the lug is in this position, as shown in Fig. 3, it lies in a horizontal plane to the right of the center line of the shaft 25, and the circular handle 27 lies in a perpendicular plane and projects upwardly from the shaft. After engagement of the hook with eye member 11, the mouth or channel 28 of the hook is closed by pushing the handle 27 forward until the lug 26 is moved out of the slotted opening 23 in the barrel 22. The shaft is then rotated through 180° until the lug projects from the shaft 25 in a horizontal plane and to the left of the shaft, and the handle projects downwardly from the shaft in a vertical plane so that its weight retains the lug in the position into which it has been moved.

With any irregular movement or jolting of the trucks the coupling cannot become unlocked as this would necessitate the angular movement of the lug 26 against the action of the weighted handle 27, until the lug registers with and enters the slotted opening 23 in the cylindrical bearing 22.

Having thus described my invention, what I claim as new and wish to secure by Letters Patent is:

1. A latching device adapted to be associated with a draft coupling of the hook type, said latching device including a slotted cylindrical sleeve bearing, a keeper slidably and rotatably mounted within said sleeve bearing adapted to bridge the channel of said hook, and gravity actuated means in connection with said sliding member adapted to retain said member in closed position across the channel of said hook.

2. A latching device adapted to be associated with a draft coupling including a hook, said latching device including a cylindrical sleeve having a slot at the forward end thereof, a keeper slidably and rotatably mounted within said bearing member said keeper being adapted to transversely bridge the channel of said hook when in locked position, a lug formed integral with said keeper and projecting radially from the forward end thereof, said lug being adapted to enter said slot when the keeper is rotated to a position where it registers therewith to thereby clear said hook channel to allow disengagement of the hook.

3. A latching device adapted to be associated with a draft coupling including a hook, a said latching mechanism comprising a sleeve bearing having a slot at the forward end thereof, said sleeve bearing being attached to the lower surface of said draft coupling, a keeper having a longitudinally extending shaft portion slidably and rotatably mounted within said bearing, said keeper being provided with a forward radially extending lug adapted to slidably fit within said slot when the latching mechanism is in unlatched position, and a handle on said shaft projecting radially therefrom adapted by its weight to prevent the shaft from rotating within the bearing when the latching mechanism is in latched position.

4. A latching mechanism adapted to be associated with a draft mechanism including a hook, said latching mechanism comprising a sleeve bearing having a slot at its forward end, said bearing being attached to the lower portion of said draft coupling beneath the base of said hook, a keeper member having a longitudinally extending shaft portion slidably and rotatably mounted within said bearing, said keeper being provided with a forward radially extending lug adapted to slidably fit within said slot in said bearing when the keeper is rotated to a position where it registers therewith to place the latching mechanism in unlatched position, and a circular handle formed integral with said shaft and projecting radially therefrom adapted by its weight to prevent the shaft from rotating and the registration of said lug with said slot when the latching mechanism is in latched position.

5. A latching device for a draft coupling adapted to be associated with said coupling to close the channel of the hook formed at one end thereof, said device comprising a sleeve connected to said coupling, and provided with a slot at one end thereof adjacent said channel, a keeper including a shaft slidably and rotatably mounted within said sleeve, said shaft being provided with a lug adapted to slidably fit within said slot and a handle adapted to effect the translation and rotation of said shaft to effect the removal of said lug from said slot and its rotation within the hook channel out of the path of said slot.

6. A latching device adapted to be associated with a draft coupling for closing the hook channel thereof, said device comprising a sleeve adapted to be connected to said coupling, said sleeve having a slot adjacent said channel, a keeper comprising a shaft adapted to be slidably and rotatably mounted within said sleeve, a lug connected to one end of said shaft and adapted to slidably fit within said slot and a handle adapted by the aid of gravity to retain said lug out of the path of said slot and across said channel to retain said hook in locking engagement.

7. A latching mechanism adapted to be associated with a draft coupling of the hook type, said latching mechanism comprising a sleeve attached to said draft coupling and provided with a longitudinal lateral slot at one end thereof adjacent the hook channel of said coupling, a keeper member having a longitudinally extending shaft portion slidably and rotatably mounted within said sleeve, said keeper being provided with a forward radially extending lug rotatable within said hook channel and adapted to be slidably retracted within said slot when the keeper is rotated to a position where said lug registers therewith to place the latching mechanism in unlatched position, and a circular handle formed integral with said shaft and projecting radially therefrom adapted by its weight to prevent the shaft from rotating within said sleeve and the registration of said lug with said slot when the latching mechanism is in latched position.

PETER P. DILBERT.